Feb. 3, 1970 R. F. HELLBAUM 3,493,004

LOGIC AND GATE FOR FLUID CIRCUITS

Filed May 6, 1968

INVENTOR.
RICHARD F. HELLBAUM

BY [signature] ATTORNEYS

United States Patent Office 3,493,004

Patented Feb. 3, 197

3,493,004

LOGIC AND GATE FOR FLUID CIRCUITS

Richard F. Hellbaum, Hampton, Va., assignor to the United States of America as represented by the Administrator of the National Aeronautics and Space Administration Filed May 6, 1968, Ser. No. 726,898
Int. Cl. F15c *1/08*
U.S. Cl. 137—81.5 4 Claims

ABSTRACT OF THE DISCLOSURE

A logic AND gate having A and B inputs which each have a pair of outlets, with one of each of these joined together to form a common output. Each of the A and B inputs is arranged to produce a wall attachment with a wall for both its outlets, but is also arranged to have a preferential attachment to a wall of its unconnected outlet. The A and B inputs are connected to directly impinge on each other in a direction tending to produce a shift of each input signal from its preferred to its joined outlet, thus yielding a nonproportional AND output. Cross venting of the output chambers results in outputs insensitive to load.

Figure 1:
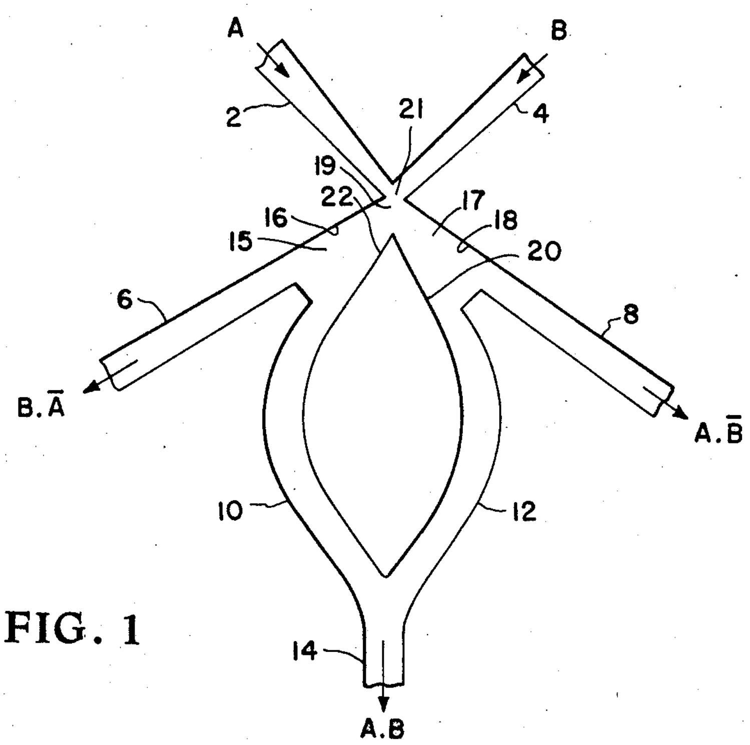

The invention described herein was made by an employee of the United States Government and may be manufactured and used by or for the Government for governmental purposes without the payment of any royalties thereon or therefor.

This invention relates to a fluid logic element, and more particularly to a fluid AND gate.

Prior art AND gates are of many different configurations, but basically are of two different types, i.e., a fluid momentum type in which the two inputs are so arranged that when both signals are present, an exchange of momentum causes deviation of each signal stream into a common outlet to produce an AND output. A second type utilizes the wall attachment principle for both the AND output and each sole output, arranging the passages so that the flow is slightly monostable away from the AND output. A cross passage between the inputs is then provided so that when flow occurs in both inputs, the draw in the cross passages biases each input so that the jets are both switched to the common AND output.

While in general satisfactory, these devices suffer from some rather substantial disadvantages. The momentum exchange type of device produces an output varying proportionally with changes in input signal magnitude, generally an undesirable effect for the uses to which such devices are put. In addition, gross differences in the input signal levels may eliminate the AND output altogether. The second type of prior art AND gate suffers from the drawback that the switching from one output to the other must be accomplished by pressures a fraction of the magnitude of the primary signals, thus requiring high gain in the switching function. This in turn leads to sensitivity of the device to dimensional variations encountered in normal manufacturing processes, and hence, these devices tend to be relatively expensive. Both of these types also are sensitive to loads on the various outputs.

Therefore, it is an object of the present invention to provide an AND gate which produces an output that does not vary proportionately with changes in input signal magnitude.

It is a further object to provide an AND gate which may be manufactured without holding dimensions to excessively close tolerances.

It is yet another object to provide an AND gate which operates normally regardless of the level of loading of the output devices.

It is a further object to provide an AND gate whic produces an output even though considerable disparit exists between the two input signals.

These and other objects of the invention which wi become apparent upon a reading of the specification ar accomplished by providing for each input passage a pa of output passages, and wall contours such that wall a tachment will occur with flow through either output pa sage, but the design in such that a preference is felt b the input flow to attach to one of the outputs. The othe output of each of the inputs are connected together t form a common output. The input passages are arrange so that flow through either input impinges on flow throug the other when flowing along its preferred path, and i a direction to cause switching of both to the connecte outlets, thus producing the AND output. Cross ventila tion of both the output chambers eliminates sensitivity t loading of the AND output.

Referring now to the specification and particularly t the drawings, FIG. 1 is a schematic of the basic ANI gate according to the present invention.

Figure 2:
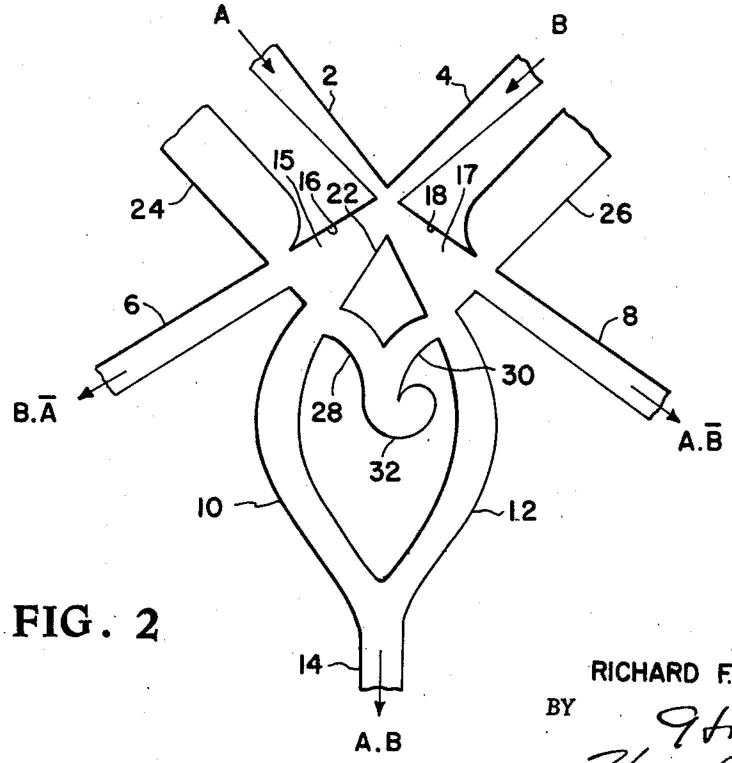

Shown in FIG. 2 is a schematic of another form of th AND gate according to the present invention.

In FIG. 1, passages 2 and 4 are the input signal pas sages for signals A and B, converging into each othe at a substantial angle. Each of these input passages 2 an 4 has a pair of related output passages 6 and 10 and and 12 respectively, downstream from the convergemen with 10 and 12 joined to form a common output 14. In put passage 2 directs fluid signal A into an output cham ber 17, formed by the two sidewalls 18 and 20. These sidewalls are contoured so that preferential wall attach ment of the jet occurs with wall 18. This may be accom plished in any number of ways, all well known in th flueric art, as by providing a wall contour 18 that deviate but slightly from the direction of the input flow A. Wal 20, on the other hand, breaks away more sharply fron input passage 2, and flow must cross a gap 19 wider thar that at 21, so that as a result, if the signal A is unin fluenced by other factors, flow preferentially attaches t sidewall 18. However, wall 20 is contoured sufficientl smoothly and continuously with respect to passage 2 tha wall attachment of flow from input 2 will occur if the je is influenced toward wall 20, as will be explained fur ther herein.

Input passage 4 directs fluid signal B into output cham ber 15, formed by the sidewalls 16 and 22. These side walls are formed so as to have the same relationship wit the input passage 4 as that discussed above with respec to input passage 2. Therefore, fluid signal jet B will pref erentially attach to wall 16, but if influenced toward wal 22, fluid wall attachment will occur with respect to thi surface.

In operation, if either signal A or B is present withou the other, no flow occurs in output 14, but entirely ir either output 6 or 8 depending on the signal present, thu producing the $A \cdot \overline{B}$ at 8 and the $B \cdot \overline{A}$ at 6. Conversely, i flow occurs in both inputs 2 and 4, the interaction of the jets A and B causes mutual influencing of the jets towarc surfaces 20 and 22, such that both jets now become at tached to its respective inner wall 20 and 22, and all o the flow now occurs in output 14, and none in outputs 6 and 8, thus yielding the AND function $A \cdot B$.

Analysis of this arrangement will show the several dis tinct advantages arising therefrom. Firstly, the output at 14 is nonproportional, since once the input jets are shifted from the outer walls, attachment to the inner walls 20 and 22 occurs and the flow is completely shifted from the outputs 6 and 8. Secondly, differences in magnitude between the inputs A and B does not affect the mode of operation, since both the output paths of A and B in the

[D mode are combined to produce the AND output. .rdly, since the entire A and B signal are exerted on each er to perform the switching function, the unit can be igned for comparatively low gain, with a considerable ıltant lessening of fabrication tolerance requirements l therefore manufacturing costs.

\ practical design of the AND gate according to the sent invention is shown in FIG. 2. This unit incorpo- ɜs the same basic configuration as that shown in FIG. but has been vented so as to eliminate sensitivity to ds on the various outputs.

[This has been accomplished by adding vents 24 and 26 chambers 15 and 17, so that excess fluid may escape en outputs 6 and 8 are loaded or blocked rather than ·ving into output 14.

:n addition, vent passages 28 and 30 have been added ich join together as a common vent 32. This functions provide complete ventilation when passages 10 and are loaded or blocked. It has been found that the lusion of a single side vent does not completely elimi- :e leakage into outputs 6 and 8 when loads are imposed an output at 14. The central vent allows excess fluid escape in both directions, thus minimizing leakage into tlets 6 and 8.

Therefore, it can be seen that an AND gate has been ɔvided which produces a nonproportional AND output ıich may be inexpensively manufactured, and which is ıensitive to loadings on the various outputs.

What is claimed as new and desired to be secured by tters Patent of the United States is:

1. A logic AND gate comprising:
   - first and second inlet passages arranged to converge into each other, each of said inlets having a first and a second outlet passage downstream from said convergement;

- means providing a fluid path from each inlet passage to its respective first and second outlet passage;
   - means for producing wall attachment flow from each of said inlets into its respective first outlet passage whenever flow occurs solely in said input passage;
   - means for producing wall attachment flow into said second outlet passages whenever flow occurs in both said inlet passages; and
   - means for providing a fluid connection between said second outlet passages, whereby a nonproportional AND output is provided.

2. The AND gate of claim 1 wherein said means for producing wall attachment flow into said second outlet passages includes a central wall member disposed downstream of said convergement and having surfaces running between each of said inlet passages and its respective second outlet passage.

3. The AND gate of claim 1 further including a vent outlet between each of said inlet passages and its respective outlet passages.

4. The AND gate of claim 1 further including vent means located on both sides of each of said fluid paths downstream of said convergement.

References Cited

UNITED STATES PATENTS

| | | | |
|---|---|---|---|
| 3,266,507 | 8/1966 | Groeber et al. | 137—81.5 |
| 3,272,214 | 9/1966 | Warren | 137—81.5 |
| 3,277,915 | 10/1966 | Dockery | 137—81.5 |
| 3,366,130 | 1/1968 | Reader | 137—81.5 |
| 3,366,131 | 1/1968 | Swartz | 137—81.5 |

M. CARY NELSON, Primary Examiner

WILLIAM R. CLINE, Assistant Examiner